(12) United States Patent
Middleton et al.

(10) Patent No.: US 6,996,820 B1
(45) Date of Patent: Feb. 7, 2006

(54) EFFICIENT MULTIPLE PRIORITY LIST MEMORY SYSTEM

(75) Inventors: Joseph Middleton, Fremont, CA (US); David Bokaie, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/287,214

(22) Filed: Apr. 5, 1999

(51) Int. Cl.
*G06F 9/00* (2006.01)

(52) U.S. Cl. .............. 718/100; 711/151; 711/153; 711/158; 711/173

(58) Field of Classification Search ............... 711/151, 711/158, 153, 173; 718/100
See application file for complete search history.

(56) References Cited

U.S. PATENT DOCUMENTS

| | | | |
|---|---|---|---|
| 3,648,252 A * | 3/1972 | Thron et al. ............... 718/103 |
| 4,734,882 A | 3/1988 | Romagosa ................. 364/900 |
| 5,115,499 A * | 5/1992 | Stiffler et al. ............. 711/148 |
| 5,507,031 A | 4/1996 | Nakamura ................. 395/800 |
| 5,867,735 A | 2/1999 | Zuravleff et al. ........... 395/872 |
| 6,058,461 A * | 5/2000 | Lewchuk et al. ........... 711/158 |
| 6,173,373 B1 * | 1/2001 | Bonola ...................... 711/147 |
| 6,226,338 B1 * | 5/2001 | Earnest ...................... 375/372 |
| 6,253,262 B1 * | 6/2001 | Rozario et al. ............... 710/39 |
| 6,269,413 B1 * | 7/2001 | Sherlock .................... 710/52 |
| 6,539,440 B1 * | 3/2003 | Stracovsky et al. .......... 710/58 |

* cited by examiner

*Primary Examiner*—Meng-Al T. An
*Assistant Examiner*—Phuong N. Hoang
(74) *Attorney, Agent, or Firm*—Ritter, Lang & Kaplan LLP

(57) ABSTRACT

An efficient memory system to implement a multi-list, multi-priority task management scheme. In one embodiment, a single list which is dynamically partitioned among multiple priority levels and effectively implements multiple priority lists. This dynamic re-allocation of memory space available to each priority level is handled using a single write pointer and multiple read pointers. There are as many read pointers as there are desired priority levels. One application is scheduling tasks so that all pending tasks are performed at least n−1 times before any pending task is performed for the nth time. An example of a task that may be scheduled is the retransmission of data in a communication system.

20 Claims, 4 Drawing Sheets

FIG. 3A

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| r1,r2,w | | | | | | | | | | | | | | | |
| x | x | x | x | x | x | x | x | x | x | x | x | x | x | x | x | p1_count = 0, p2_count = 0

FIG. 3B

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| r1,r2 | w | | | | | | | | | | | | | | |
| p1 | x | x | x | x | x | x | x | x | x | x | x | x | x | x | x | p1_count = 1, p2_count = 0

FIG. 3C

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| r1,r2 | | | | | | | | | | | | | | w | |
| p1 | p1 | p1 | p1 | p1 | p1 | p1 | p1 | p1 | p1 | p1 | p1 | p1 | p1 | p1 | x | p1_count = 15(max), p2_count = 0

FIG. 3D

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| w | | | | | | | | | | | | | | | |
| p1' | p1 | p1 | p1 | p1 | p1 | p1 | p1 | p1 | p1 | p1 | p1 | p1 | p1 | p1 | p1 | p1_count = 15(max), p2_count = 0

FIG. 3E

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| | w | r1,r2 | | | | | | | | | | | | | |
| p1' | p1 | p1 | p1 | p1 | p1 | p1 | p1 | p1 | p1 | p1 | p1 | p1 | p1 | p1 | p1 | p1_count = 15(max), p2_count = 0

FIG. 3F

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| | w | r2 | r1 | | | | | | | | | | | | |
| p1' | p1 | p1 | p1 | p1 | p1 | p1 | p1 | p1 | p1 | p1 | p1 | p1 | p1 | p1 | p1 | p1_count = 14, p2_count = 1 (after spacing delay)

FIG. 3G

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| | w | r2 | | | | | | | | | | | | | |
| p1' | p1* | p2 | p2 | p2 | p2 | p2 | p2 | p2 | p2 | p2 | p1 | p1 | p1 | p1 | p1 | p1_count = 6, p2_count = 9 (after spacing delay)

FIG. 3H

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| | | | | w | r2 | | | | | | r1 | | | | |
| p1' | p1' | p1" | p1" | p2* | p2 | p2 | p2 | p2 | p2 | p2 | p1 | p1 | p1 | p1 | p1 | p1_count = 9, p2_count = 6 (immediately)

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
|   |   |   |   | r1,w | r2 |   |   |   |    |    |    |    |    |    |    |
| p2 | p2 | p2 | p2 | p2* | p2 | p2 | p2 | p2 | p2 | p2 | p2 | p2 | p2 | p2 | p2 | p1_count = 0, p2_count = 15 (after spacing delay)

FIG. 3J

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
|   |   |   |   | r1,w |   |   |   |   |    |    |    |    |    | r2 |    |
| p2 | p2 | p2 | p2 | p2* | x |   |   |   |    |    |    |    |    | p2 | p2 | p1_count = 0, p2_count = 6

FIG. 3K

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
|   |   |   |   | r1 | p1 | w |   |   |    |    |    |    |    | r2 |    |
| p2 | p2 | p2 | p2 | p1" | p1 | x |   |   |    |    |    |    |    | p2 | p2 | p1_count = 2, p2_count = 6

FIG. 3L

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
|   |   |   |   |   |   | r1,w |   |   |    |    |    |    |    |    |    |
| p2 | p2 | p2 | p2 | p2 | p2 | x | x | x | x | x | x | x | x | x | x | p1_count = 0, p2_count = 8 (after spacing delay)

FIG. 3M

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
|   |   | r2 |   |   |   | r1,w |   |   |    |    |    |    |    |    |    |
| x | x | p2 | p2 | p2 | p2 | x | x | x | x | x | x | x | x | x | x | p1_count = 0, p2_count = 4

FIG. 3N

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
|   |   | r2 |   |   |   | r1 |   |   |    |    |    |    |    |    | w |
| x | x | p2 | p2 | p2 | p2 | p1 | p1 | p1 | p1 | p1 | p1 | p1 | p1 | p1 | x | p1_count = 9, p2_count = 4

FIG. 3O

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
|   |   |   |   |   |   |   |   |   |    | w  | r1,r2 |    |    |    |    |
| p1 | p1 | p1" | p1" | p1" | p1" | p1' | p1' | p1' | p1' | p1* | p1 | p1 | p1 | p1 | p1 | p1_count = 15 (max), p2_count = 0 (immediately)

EFFICIENT MULTIPLE PRIORITY LIST MEMORY SYSTEM

The present application is related to the subject matter of the co-assigned, co-filed application entitled IMPROVED ARQ FOR POINT TO POINT LINKS, U.S. application Ser. No. 09/287,212, filed Apr. 5, 1999, the contents of which are herein incorporated by reference for all purposes.

BACKGROUND OF THE INVENTION

The present invention is related to a scheme for addressing memory and more particularly to systems and method for using memory to implement multiple priority lists listing tasks to be performed.

Retransmitting data upon request is a well-known method for improving error performance in data communication systems where errors are detectable and a link from the receiver to the transmitter is available. Systems that provide this retransmission capability are often known as ARQ (Automatic Retransmission ReQuest) systems. For example, if a single request for retransmission may always be made and fulfilled, a channel having a bit error rate of $1\times10^{-6}$ may have its effective bit error rate reduced to $1\times10^{-12}$.

An ARQ system is described in the co-filed application entitled IMPROVED ARQ FOR POINT TO POINT LINKS. In the system described there, data communication between two ends of a point to point link is divided into codewords. The encoding schemes and decoding schemes employed by the link allow the receiver to determine whether a given codeword has been received in error. When the receiver detects that a codeword has been received in error, it may transmit a retransmission request to the transmitter via a reverse link. The transmitter may fulfill the retransmission request one or more times.

Communication of retransmission requests and actual retransmissions consumes link capacity that is therefore unavailable for first time transmissions of data. A representative ARQ system fixes the ratio between retransmission requests and codeword transmissions over a link. This representative ARQ system allows some programmability of the maximum percentage of link capacity usable for requested retransmissions and the number of consecutive codewords that may be used for retransmissions as opposed to new transmissions of data. This capacity is consumed on an "as-needed" basis; when there are no errors, no extra retransmission overhead is used.

When retransmissions are requested, it would be desirable to fulfill all recent pending requests at least n−1 times before fulfilling any pending request n times. In the other direction, it would be desirable to send n−1 retransmission requests in response to all recently received corrupted codewords before sending an nth retransmission request for any corrupted codeword. In this way, available link capacity for ARQ operation may be optimally shared among corrupted codewords.

A priority scheme that provides this desirable property is described in the co-filed application. Multiple priority lists are provided with the number of priority lists corresponding to the maximum permissible number of retransmissions. When a new request for retransmission is received, it causes creation of a corresponding entry on the highest priority list, the entry indicating which codeword is to be transmitted. When there is a retransmission opportunity, the oldest entry is removed from the highest priority non-empty list and the codeword that it identifies is retransmitted. This entry is then moved to the next highest priority list after a programmable delay. A similar priority list scheme is used to handle retransmission requests as opposed to the retransmissions themselves. It should be noted that the ARQ scheme described here is not admitted to be prior art to the present application.

It is desirable to provide as many priority lists as possible to maximize the number of possible retransmissions or retransmission requests when capacity is available so that the probability of correct transmission is maximized. It is also desirable to maximize the storage capacity available for each priority list as large as possible to maximize the number of pending retransmissions or retransmission requests that may be serviced before it is necessary to overwrite priority list memory. It is further desirable to include the priority list memory on the same integrated circuit to maximize speed and minimize size and cost. The desired integration and maximization of storage capacity are contradictory objectives. Maintaining multiple priority lists of sufficient length would require off-chip memory.

SUMMARY OF THE INVENTION

An efficient memory system to implement a multi-list, multi-priority task management scheme is provided by virtue of the present invention. In one embodiment, a single list is dynamically partitioned amoung multiple priority levels and effectively implements multiple priority lists. This dynamic re-allocation of memory space available to each priority level is handled using a single write pointer and multiple read pointers. There are as many read pointers as there are desired priority levels. One application is scheduling tasks so that all pending tasks are performed at least n−1 times before any pending task is performed for the nth time. An example of a task that may be scheduled is the retransmission of data in a communication system.

According to a first aspect of the present invention, a memory system includes a plurality of storage cells that each store a data value, and a memory control system that identifies particular ones of said storage cells as targets of read and write commands. Data values written to ones of said plurality of storage cells identified by said memory control system identify tasks to be performed later. The memory control system determines an order of performing said tasks by controlling an order of reading data values from said plurality of storage cells. The memory control system reads out said data values so that a selected task is performed n times if and only if all other ones of said tasks have been performed n−1 times. The memory control system allocates only one storage cell per task even if tasks are performed repeatedly.

A further understanding of the nature and advantages of the inventions herein may be realized by reference to the remaining portions of the specification and the attached drawings.

BRIEF DESCRIPTION OF DRAWINGS

The present invention will be readily understood by the following detailed description in conjunction with the accompanying drawings, wherein like reference numerals designate like structural elements, and in which:

FIGS. 3A–3O depict operation of the memory system of FIG. 2 according to one embodiment of the present invention.

DESCRIPTION OF SPECIFIC EMBODIMENTS

The present invention will be discussed with reference to a particular application where limited resources are available to perform a series of tasks. It is preferable to perform the tasks multiple times but no task should be performed n times until all tasks are performed n−1 times so that resources are shared fairly among tasks. An example of such an application is retransmission of data received in error or forwarding of retransmission requests for such data.

Figure 1:
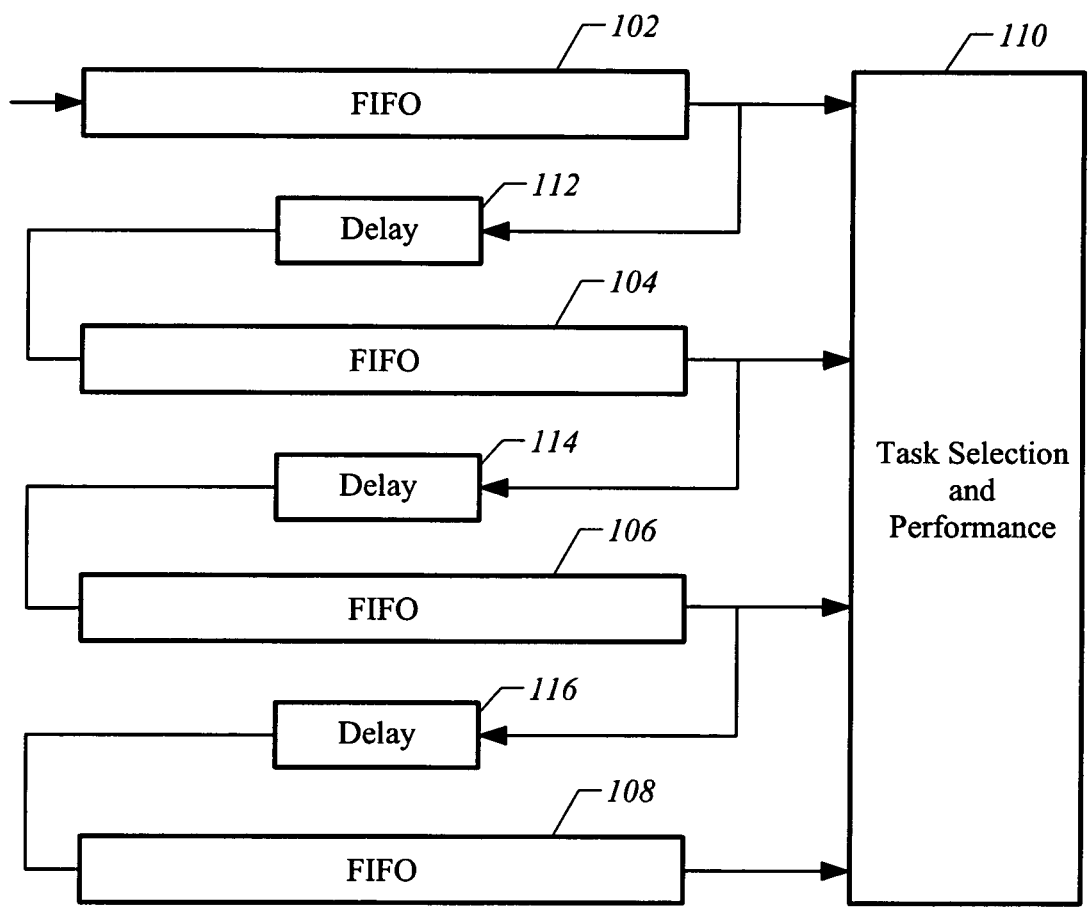
FIG. 1 depicts a priority list scheme implemented by one embodiment of the present invention.

FIG. 1 depicts a priority list scheme implemented by one embodiment of the present invention. The functional blocks of FIG. 1 are not intended to represent hardware but rather a model of functionality of a memory system. First, second, third, and fourth FIFO's 102, 104, 106, and 108 store lists of tasks to be performed. Each task is represented by a data value. First FIFO 102 represents the highest priority list, second FIFO 104, the next highest priority list and so on. Tasks stored in first FIFO 102 have not yet been performed once, tasks stored in second FIFO 104 have been performed once but not twice. Tasks stored in third FIFO 106 have been performed twice but not three times. Tasks stored in fourth FIFO 108 have been performed three times but not four times. The system depicted in FIG. 1 allows for a maximum of four repetitions of tasks. The lists are represented by FIFOs to demonstrate that at any given priority level, the oldest (first stored) task is performed first. When the priority list system learns of a new task to be performed it is placed in first FIFO 102 because a task that has not even been performed once has the highest priority.

When resources are available for performing a task, a task selection and performance system 110 selects and retrieves a task from the output of the highest priority non-empty FIFO. After a task has been retrieved from a given priority list, it is 1) removed from that given priority list and 2) transferred to the input of the next lowest priority list if there is one. The transfer to the FIFO storing the next highest priority list occurs only after a delay represented by one of delay blocks 112, 114, or 116. This imposes a minimum interval for the repetition of any one task.

One way to implement the scheme of FIG. 1 is to simply provide FIFO memory to implement the FIFO blocks and shift registers to implement the delay blocks. This is, however, very memory inefficient under conditions when there are too few resources to perform tasks multiple times since the FIFO space used for lower priority lists would then remain empty. One solution would be to reduce the number of lists to reduce the amount of memory required. However, performing tasks multiple times is desirable when resources are available. Also, it is desirable to minimize the use of memory so that memory may be integrated on the same chip with the circuitry that actually performs the tasks. This is optimal from a speed and cost standpoint since off-chip memory access is not necessary.

According to the present invention, a single list is maintained and each task has a single entry in the list. The list is maintained in a circularly addressed memory. Locations in the memory are dynamically allocated among multiple priority levels. Each priority level may still be understood as having a corresponding priority list but the lists share hardware with storage cells being passed between them according to need. A single write pointer is maintained and there are as many read pointers as there are priority levels. An arbitrary number of priority levels may be supported to allow more task repetitions with only a small amount of extra hardware necessary to support management of each additional read pointer and additional shift registers to implement minimum task repetition intervals.

When the priority list is empty, all pointers are at the same arbitrary location in a circularly addressed memory. When data enters the memory via the write pointer, it is always placed "between" the write pointer (w) and the priority 1 memory read pointer (r1), thus making priority one memory not empty (i.e.: r1 is not equal to w). Data is read only from priority 1 memory (from the location identified by the r1 pointer) until it is empty, at which point only priority 2 memory is read (from the location identified by an r2 pointer) until either priority 2 memory is empty, or new data is written to the location identified by w. If no new data enters, once priority 2 memory empties, priority 3 memory is read (from a location identified by an r3 pointer) until either priority 3 memory empties or new data enters priority 1 memory. If one new entry arrives, priority 1 memory is no longer empty and r1 will be used as the pointer for one read operation, emptying priority 1 memory. Priority 2 memory will remain empty for some period (dictated by the allowed spacing between repetitions of the same tasks) during which time r3 is active as the read pointer.

Once priority two memory is allowed to use the new entry, one read operation employs r2 as the read pointer and empties priority 2 memory. Reading resumes employing r3 as the read pointer where it left off, and makes a final read of the new data (after satisfying repetition spacing requirements) before priority 3 memory also empties. This process continues for as many levels as implemented. In the case where an amount of data is written to the memory that equals or exceeds the total memory capacity, and no reads have been made, the entire memory becomes priority list 1 memory. Any entries beyond the memory capacity are entered such that the oldest locations are over-written with the newest data, and the write pointer "sweeps-up" any read pointers it comes across as memory is filled. This implies the write pointer is never allowed to cross or match-up with any of the read pointers. When memory is full and new entries arrive, this feature also ensures the oldest, lowest priority data gets over-written first if large amounts of write activity occur.

Figure 2:
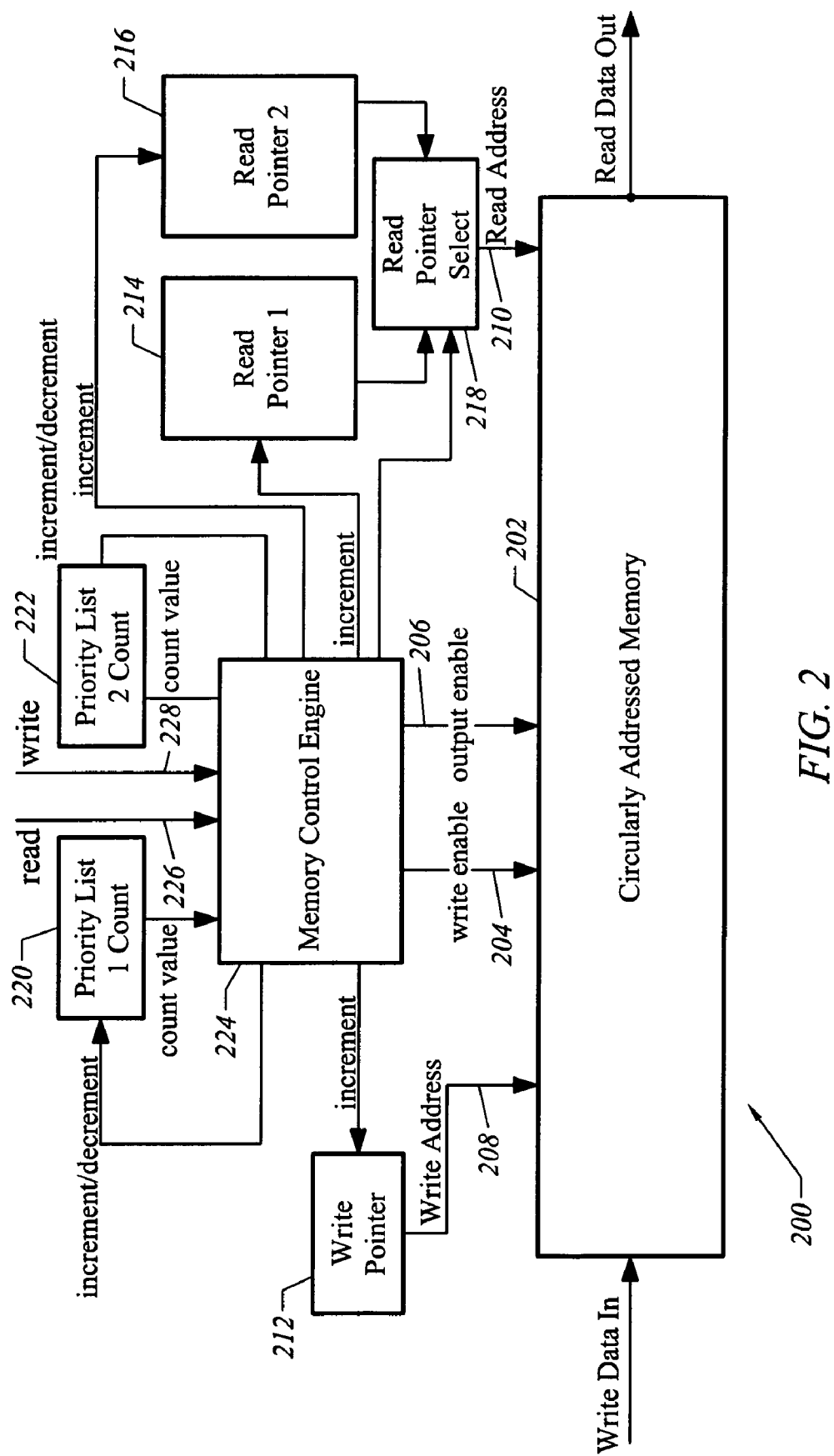
FIG. 2 depicts a memory system according to one embodiment of the present invention.

FIG. 2 depicts a memory system 200 according to one embodiment of the present invention. A circularly addressed memory 202 includes a series of cells, each cell capable of storing a value. Activation of a write enable signal 204 permits write data to be written into memory 202. Activation of an output enable signal 206 causes data to be read out of memory 202. Addresses for reading and writing are defined by a write address signal 208 and a read address signal 210, respectively. A write pointer value is stored in a write pointer register 212.

In the example depicted in FIG. 2, there are two priority levels so there are two read pointer registers 214 and 216. A read pointer selector 218 selects one of the two read pointers for input to memory 202 depending on which priority level is current active for retrieving tasks to be performed. A count of the number of tasks on the highest priority list is maintained by a priority list 1 count register 220. A count of the number of tasks on the lowest priority list is maintained by a priority list 2 count register 222. It will be appreciated that the number of read counters and the number of priority list count registers will depend on the number of priority levels implemented. A memory control engine 224 controls incrementation and/or decrementation of the various pointers, selection of the read pointer, and activation of the write enable and read enable lines of circularly addressed memory 202. Together, memory control engine 224 and the various pointers, count registers, and pointer selection block constitute a memory control system for memory 202. The inputs to this memory control system are a read line 226 which indicates an external request for a value, representing, e.g., a task to be performed next, and a write line 228 indicating that a new task has been requested and should be put onto the highest priority list.

The operation of memory system 200 will be described with reference to FIGS. 3A–3O. FIGS. 3A–3O depict the contents of memory 202 at successive albeit not consecutive times. Each of FIGS. 3A–3O is a table with two rows and 16 columns. Each column represents a storage cell in memory 202. For each column the bottom row shows the contents of the corresponding storage cell while the top row identifies any pointers currently pointing to that storage cell. In the top row, the abbreviation "w" refers to the contents of write pointer register 212 that define the write pointer location. The abbreviation "r1" refers to the contents of read pointer register 214 and the abbreviation "r2" refers to the contents of read pointer register 216. Also, below each table in FIGS. 3A–3O, the contents of the two count registers 220 and 222 are presented.

In one embodiment, memory system 200 is implemented on a field programmable gate array (FPGA). The FPGA may also include hardware that actually performs the tasks identified by the values stored in memory device 202.

FIG. 3A shows an initial state of memory system 200. All of the storage cells have undetermined "don't care" values indicated by x. Arbitrarily, the write pointer and read pointers point to storage cell 1. The next value to be written will be written to storage cell 1. Both priority list count values are zero indicating that both priority lists are empty.

In FIG. 3B, a single new value has been written to storage cell 1. It is labeled as "p1" to indicate that is on the first priority list (the highest priority list or priority list 1). All new values are written to the highest priority list. This is done by writing "between" the write pointer and the r1 pointer. The write pointer has moved to storage cell 2 to indicate that that cell is the next location for writing. The write pointer increments after every write operation in this embodiment. The priority list 1 count has incremented to one. The priority list 1 count also increments after every write operation in this embodiment.

FIG. 3C depicts the situation after 14 more values have been written to the highest priority list with no values having been read. The read pointers remain at storage cell 1. The priority list 1 count has incremented to 15 indicating 15 entries on the highest priority list.

In FIG. 3D, another value has been written without any read operations having occurred. This value was written to storage cell 16. Since the address space is circular, the write pointer now points to storage cell 1. The entry "p1*" indicates that the priority list 1 entry there will be overwritten by the next entry. The priority list 1 count does not increment further because 15 is its maximum. In this embodiment, the maximum value for any priority list count is the number of storage cells minus one. This is because once a priority list uses all available storage cells, further write operations effectively cause a simultaneous increment and decrement.

In FIG. 3E, yet another value has been written without any read operations having occurred. Storage cell 1 has the entry p1* indicating that a new entry has overwritten the oldest entry from priority list 1. The next old entry to be overwritten is p1* in storage cell 2. Both read pointers have incremented even though no read operation has occurred. In this embodiment, the write pointer never catches up with or crosses the read pointer. When the write pointer catches up to either of the read pointers, the read pointer increments by one to stay ahead of the write pointer. The priority list 1 count stays at its maximum 15.

In FIG. 3F, a single read operation has occurred with no additional write operations. Since priority list 1 is non-empty as indicated by the non-zero value in its count register, the read operation is from the first priority list. Memory control engine 224 directs reading from the first priority list by reading from the location pointed to be the first read pointer, r1. R1 is then incremented, the priority list 1 count is decremented. The priority list 2 count is then incremented. In one embodiment, the priority list two count is only incremented after a delay which implements the operation of the delay blocks in FIG. 1 and assures a minimum interval between repetitions of the same task. The incrementation signal from memory control engine 224 to priority list 2 count register 222 may be passed through a shift register to implement this delay. The value in storage cell 3 which has just been read out is now marked as "p2" to indicate that it has been shifted from priority list 1 to priority list 2. It should be noted that the change of marking is only for clarification in the figure; no actual changes are made to the memory contents.

In one embodiment, there is further processing (not depicted) after the read output to check the "age" of the entry being read out. Only values below a maximum age are output from memory system 200. One way to facilitate this age checking is to append a time stamp to the stored values.

In FIG. 3G, 8 more values have been read out from priority list 1 so that the priority list 1 count has decremented to 6 and the priority list 2 count has incremented to 9. In FIG. 3H, there have been three more write operations with no more read operations. The first write operation to storage cell 2 overwrote a the oldest priority list 1 entry. The second two write operations to storage cells 3 and 4 overwrote two second priority list entries. As the write pointer advances, it sweeps the second read pointer, r2, ahead. The priority list 1 count is incremented by 1 and the priority list 2 count is decremented by 3. The decrementations occur immediately without further delay. Note that this immediate decrementation is different than the delay incurred before incrementing the priority list 2 count. The new entries overwriting the priority list 2 entries are priority list 1 entries and are labeled p1**.

It is possible for the priority list 2 count to go below zero. This behavior occurs when entries have been read from priority list 1 but they are overwritten by new priority list 1 entries before the delay period for priority list 2 count incrementation has expired. In systems having more than two priority lists, this behavior could occur for any priority list n count for n greater than or equal to 2.

In FIG. 3I, 9 read operations using r1 have occurred and no write operations have occurred. The priority list 1 count has decremented to zero and r1 has incremented to the write pointer. Note that a read pointer may catch up to the value of a write pointer but the write pointer may not catch up to the value of a read pointer in this embodiment. Since the first priority list is now empty and the second priority list is not empty, the next read operation will be from priority list 2 and will be from a storage cell pointed to by r2. In general for embodiments employing two or more priority lists, read pointer r(n+1) begins operating for new reads when the Pn (the priority list count for level n) becomes less then or equal to zero while P(n+1)>0. A priority list is defined to be empty when its count is less than or equal to zero.

In FIG. 3J, there have been 9 read operations from the second priority list with no further write operations. All of the values read out from the second priority list are marked as x because there are no more priority lists and these values will not be read out again. Of course, there can be more than two priority lists in which case these entries would be marked as p3 indicating their membership in a third priority list. A priority list 3 count would be incremented after each read operation from the second priority list following an incrementation delay.

In FIG. 3K, two more write operations have occurred with no further read operations. As always, the new entries are written to the first priority list and the priority list 1 count is incremented by two. In FIG. 3L two further read operations have occurred. Since the new write operations have made the first priority list non-empty, the read operations are from the first priority list and retrieve values from the locations pointed to by r1. Again the priority list 2 count is incremented after an incrementation delay and the priority list 1 count is decremented immediately. Thus the data values which had just been written in FIG. 3K are read out before any of the other values in memory 202 since the other values have all been read once. The first priority list is now empty again.

In FIG. 3M, there have been four read operations from the second priority list with no further write operations. The priority list 2 count has been decremented by four. All of the values that have been read will not be read again in the two priority list scheme so their storage cells are marked by x. In FIG. 3N, there have been nine write operations to the first priority list with no further read operations. The priority list 1 count has been incremented to 9. In FIG. 3O, there have been 11 further write operations. The priority list 1 count has incremented to the maximum value of 15. The priority list 2 count has decremented to zero because all of the priority list two entries have been overwritten. The read pointers r1 and r2 have been swept along by the write pointer so they now point one location ahead of the write pointer.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. All publications, patents, and patent applications cited herein are hereby incorporated by reference.

What is claimed is:

1. A method for operating a memory device including a plurality of storage cells:
   dynamically partitioning said memory device into a plurality of priority lists;
   directing new data to be stored in said memory device to storage cells belonging to a highest priority list of said plurality of priority lists;
   reading data from said memory device only from a highest priority non-empty priority list; and
   transferring said data read from said memory device from said highest priority non-empty priority list to a next lower priority list after reading without movement between storage cells; and
   wherein after reading said data and transferring said data, said data is maintained on said next lower priority list within said memory device.

2. The method of claim 1 wherein dynamically partitioning comprises:
   providing a write pointer and a plurality of read pointers each of said read pointers corresponding to one of a plurality of priority levels corresponding to said plurality of priority lists.

3. The method of claim 2 wherein directing comprises:
   writing data to a location in said memory device determined by said write pointer and thereafter incrementing said write pointer.

4. The method of claim 2 wherein reading comprises:
   reading data from a location in said memory device determined by one of said plurality of read pointers corresponding to said highest priority non-empty priority list.

5. The method of claim 4 wherein dynamically partitioning further comprises:
   providing for each of said priority lists a count register indicating an allocated number of storage cells.

6. The method of claim 5 wherein transferring comprises:
   incrementing said read pointer corresponding to said highest priority non-empty priority list;
   decrementing one of said count registers corresponding to said highest priority non-empty priority list; and
   incrementing one of said count registers corresponding to a next highest priority priority list.

7. The method of claim 1 wherein said count register corresponding to said next highest priority priority list is incremented only after a delay.

8. The method of claim 1 wherein said data read from said memory device represents a retransmission task.

9. Apparatus for operating a memory device including a plurality of storage cells:
   means for dynamically partitioning said memory device into a plurality of priority lists;
   means for directing new data to be stored in said memory device to storage cells belonging to a highest priority list of said plurality of priority lists;
   means for reading data from said memory device only from a highest priority non-empty priority list; and
   means for transferring said data read from said memory device from said highest priority non-empty priority list to a next lower priority list after reading without movement between storage cells; and
   wherein after reading said data and transferring said data, said data is maintained on said next lower priority list within said memory device.

10. The apparatus of claim 9 wherein said means for dynamically partitioning comprises:
    means for providing a write pointer and a plurality of read pointers each of said read pointers corresponding to one of a plurality of priority levels corresponding to said plurality of priority lists.

11. The apparatus of claim 10 wherein means for directing comprises:
    means for writing data to a location in said memory device determined by said write pointer and thereafter incrementing said write pointer.

12. The apparatus of claim 10 wherein said means for reading comprises:
    means for reading data from a location in said memory device determined by one of said plurality of read pointers corresponding to said highest priority non-empty priority list.

13. The apparatus of claim 12 wherein said means for dynamically partitioning further comprises:
  means for providing for each of said priority lists a count register indicating an allocated number of storage cells.

14. The apparatus of claim 13 wherein said means for transferring comprises:
  means for incrementing said read pointer corresponding to said highest priority non-empty priority list;
  means for decrementing one of said count registers corresponding to said highest priority non-empty priority list; and
  means for incrementing one of said count registers corresponding to a next highest priority priority list.

15. The apparatus of claim 14 wherein said count register corresponding to said next highest priority priority list is incremented only after a delay.

16. The apparatus of claim 9 wherein said data read from said memory device represents a retransmission task.

17. Apparatus for storing data, said apparatus comprising:
  a memory device dynamically partitioned into a plurality of priority lists, wherein new data to be stored in said memory device is directed to storage cells belonging to a highest priority list of said plurality of priority lists; and
  a memory control engine that reads data from said memory device only from a highest priority non-empty priority list, transfers said data read from said memory device from said highest priority non-empty priority list to a next lower priority list after reading without movement between storage cells; and
  wherein after reading said data and transferring said data, said data is maintained on said next lower priority list.

18. The apparatus of claim 17 wherein said memory control engine comprises:
  a write pointer and a plurality of read pointers each of said read pointers corresponding to one of a plurality of priority levels corresponding to said plurality of priority lists.

19. The apparatus of claim 17 wherein said memory control engine further comprises:
  a count register for each of said priority lists indicating an allocated number of storage cells.

20. The apparatus of claim 19 wherein said count register corresponding to said next highest priority list is incremented only after a delay.

* * * * *